United States Patent
Auner et al.

(10) Patent No.: US 8,177,943 B2
(45) Date of Patent: May 15, 2012

(54) SOLID POLYSILANE MIXTURES

(75) Inventors: Norbert Auner, Glashuetten (DE); Sven Holl, Gueckingen (DE); Christian Bauch, Usingen (DE); Gerd Lippold, Markkleeberg (DE); Rumen Deltschew, Leipzig (DE)

(73) Assignee: Spawnt Private S.A.R.L., Luxembourg (LU)

( * ) Notice: Subject to any disclaimer, the term of this patent is extended or adjusted under 35 U.S.C. 154(b) by 70 days.

(21) Appl. No.: 12/402,852

(22) Filed: Mar. 12, 2009

(65) Prior Publication Data

US 2010/0004385 A1    Jan. 7, 2010

Related U.S. Application Data

(63) Continuation-in-part of application No. PCT/DE2007/001648, filed on Sep. 13, 2007.

(30) Foreign Application Priority Data

Sep. 14, 2006 (DE) .................. 10 2006 043 929

(51) Int. Cl.
*B01J 19/08* (2006.01)
*H05F 3/00* (2006.01)

(52) U.S. Cl. .................. 204/157.44; 204/164; 324/349

(58) Field of Classification Search .................. 524/588
See application file for complete search history.

(56) References Cited

U.S. PATENT DOCUMENTS

| | | | |
|---|---|---|---|
| 2,709,176 A | 5/1955 | Bluestein | |
| 2,945,797 A | 7/1960 | Cherier | |
| 3,219,788 A | 11/1965 | Schweickert | |
| 3,625,846 A | 12/1971 | Murdoch et al. | |
| 3,933,985 A | 1/1976 | Rodgers | |
| 3,968,199 A | 7/1976 | Bakay | |
| 4,070,444 A | 1/1978 | Ingle | |
| 4,102,764 A | 7/1978 | Harvey, II et al. | |
| 4,102,985 A | 7/1978 | Harvey, II | |
| 4,138,509 A | 2/1979 | Ingle et al. | |
| 4,309,259 A | 1/1982 | Sarma et al. | |
| 4,321,246 A | 3/1982 | Sarma | |
| 4,374,182 A | 2/1983 | Gaul et al. | |
| 4,377,564 A | 3/1983 | Dahlberg | |
| 4,382,071 A | 5/1983 | Otsuka et al. | |
| 4,404,256 A | 9/1983 | Anand | |
| 4,416,913 A | 11/1983 | Ingle et al. | |
| 4,537,942 A * | 8/1985 | Brown-Wensley et al. .... 528/12 |
| 4,604,272 A | 8/1986 | Kratel et al. | |
| 4,683,147 A | 7/1987 | Eguchi | |
| 4,786,477 A | 11/1988 | Yoon et al. | |
| 4,814,155 A | 3/1989 | Sharp et al. | |
| 4,836,997 A | 6/1989 | Lepage et al. | |
| 4,847,059 A | 7/1989 | Nakata | |
| 4,873,297 A | 10/1989 | Rengstl | |
| 4,908,330 A | 3/1990 | Arai et al. | |
| 5,034,208 A | 7/1991 | Ikeda | |
| 5,132,375 A | 7/1992 | Satori et al. | |
| 5,194,398 A | 3/1993 | Miyachi | |
| 5,273,587 A | 12/1993 | Guha | |
| 5,374,413 A | 12/1994 | Kim et al. | |
| 6,518,087 B1 | 2/2003 | Furusawa | |
| 6,527,847 B1 * | 3/2003 | Matsuki ..................... 106/287.1 |
| 6,703,265 B2 | 3/2004 | Asami | |
| 6,846,473 B2 | 1/2005 | Kirii | |
| 6,858,196 B2 | 2/2005 | Todd | |
| 7,314,513 B1 * | 1/2008 | Zurcher et al. ........... 106/287.14 |
| 7,485,691 B1 * | 2/2009 | Guo et al. ....................... 528/17 |
| 7,799,302 B1 * | 9/2010 | Kunze et al. ............... 423/327.1 |
| 2002/0187096 A1 | 12/2002 | Kendig | |
| 2003/0147798 A1 | 8/2003 | Kirii | |
| 2004/0131528 A1 | 7/2004 | Kendig | |
| 2004/0152287 A1 | 8/2004 | Sherrill | |
| 2004/0224089 A1 | 11/2004 | Singh | |
| 2004/0250764 A1 * | 12/2004 | Nagano et al. ................. 118/715 |
| 2005/0142046 A1 | 6/2005 | Todd | |
| 2005/0227020 A1 * | 10/2005 | Sharafutdinov et al. ...... 427/596 |
| 2007/0190265 A1 | 8/2007 | Aoki | |
| 2008/0102218 A1 | 5/2008 | Comita | |
| 2009/0127093 A1 | 5/2009 | Auner | |
| 2009/0169457 A1 | 7/2009 | Auner | |
| 2010/0080746 A1 | 4/2010 | Lang | |

FOREIGN PATENT DOCUMENTS

| | | |
|---|---|---|
| DE | 1982587 | 4/1968 |
| DE | 3518620 | 11/1986 |
| DE | 4214045 | 4/1992 |
| DE | 10337309 | 3/2005 |
| DE | 10206034061 | 1/2006 |
| DE | 102005024041 | 11/2006 |
| EP | 0150069 | 1/1985 |
| EP | 0282037 | 9/1988 |
| EP | 1087428 | 3/2000 |
| GB | 754554 | 8/1956 |

(Continued)

OTHER PUBLICATIONS

Von D.N. Andrejew; Synthesis of silicon compounds . . . ; Journal of Practical Chemistry; 1964; pp. 288-297. T.F. Ciszek; Solar-grade silicon from metallurgical . . . ; Conference Record of the IEEE; vol. 29; 2002; pp. 206-209.
O.H. Giraldo; Synthesis and characterization of halogenated . . . ; Chem. Mater.; vol. 10; 1998; pp. 366-371.
K. Hata; Pilot plant experiments for . . . ; Japan. Tohoku Daigaku Senko Seiren Kenkyusho Iho 23; 1967; pp. 45-54.
P.M. Jeffers; Syntheses in a low power microwave . . . ; Journ. Non-Crystalline Solids; vol. 57; 1983; pp. 189-193.

(Continued)

*Primary Examiner* — Robert Loewe
(74) *Attorney, Agent, or Firm* — Jonathan Myers; Andrew Wilford

(57) ABSTRACT

The invention is directed to mixtures of polysilanes macroscopically solid at ambient temperature wherein the individual components of the composition $Si_nH_{2n}$ and/or $Si_nH_{2n+2}$ of which decompose before they are boiling at an applied process pressure and which are produced from the hydrogenation of plasmachemically generated largely chlorinated polysilane mixtures. These mixtures of polysilanes are especially suited to be applied onto surfaces as solutions or dispersions and to obtain silicon-based structures or layers in subsequent process steps. Furthermore, they are especially safe in handling and can be additionally made up into transport forms in suitable transport containers.

32 Claims, No Drawings

FOREIGN PATENT DOCUMENTS

| | | |
|---|---|---|
| GB | 823383 | 11/1959 |
| GB | 883326 | 11/1961 |
| GB | 892014 | 3/1962 |
| GB | 207710 | 6/1981 |
| JP | 59195519 | 11/1984 |
| JP | 60 086274 | 5/1985 |
| JP | 60 112610 | 6/1985 |
| JP | 62 143814 | 6/1987 |
| JP | 1192716 | 8/1989 |
| JP | 1197309 | 8/1989 |
| JP | 2004331551 | 11/2004 |
| JP | 2004331552 | 11/2004 |

OTHER PUBLICATIONS

P. John; The electrical conductivity of polysilane; J. Chem. Soc. Chem. Comm.; 1983; pp. 1496-1497.

M. Shimoda; Solution-processed silicon films and transistors; Nature; vol. 440; 2006; pp. 783-786.

\* cited by examiner

SOLID POLYSILANE MIXTURES

CROSS REFERENCE TO RELATED APPLICATIONS

This application is a continuation-in-part of PCT/DE 2007/001648 filed 13 Sep. 2007 and claiming the benefit of the priority of German Patent Application 10 2006 043 929.5 filed 14 Sep. 2006.

FIELD OF THE INVENTION

The invention is directed to solid mixtures of polysilanes the individual components of which decompose and which are obtained from the hydrogenation of plasmachemically produced largely halogenated, preferably fluorinated, especially preferred chlorinated, polysilane mixtures.

BACKGROUND OF THE INVENTION

Generally, compounds of the composition $Si_nH_{2n}$ or $Si_nH_{2n+2}$ with n>1 are designated as polysilanes in the sense of the invention. Polysilanes can contain linear $Si_n$ chains and/or $Si_n$ rings and can include chain branchings.

Polysilanes of the composition $Si_nH_{2n}$ or $Si_nH_{2n+2}$ with n>10, preferably with n>12, are designated as high-molecular polysilanes or polysilanes with high-molecular masses in the sense of the invention. This corresponds to molar weights of more than 350 g/mol.

Mixtures of polysilanes the individual components of which are solid at ambient temperature are designated as solid mixtures of polysilanes.

As boiling in the sense of the invention a condition is designated at which the vapor pressure of a substance corresponds to the applied process pressure, as boiling point in the sense of the invention a temperature is designated according to which the vapor pressure of a substance reaches the applied process pressure. The substance can be present in liquid or in solid form at the boiling point and during the boiling. This includes expressively the sublimation, i.e. the direct transition from solids into the gaseous condition. If the decomposition temperature of a substance is reached before the same begins to boil the boiling point of the substance at the applied process pressure is the temperature according to which the substance would theoretically boil emanating from the vapor pressure curve of the substance.

Hydrogen-substituted polysilanes with high boiling points are suited for the generation of silicon layers or silicon structures since solutions of the polysilanes in solvents with lower boiling point than that of the solved polysilanes can be intentionally applied, the solvent can be removed and the remaining high-boiling polysilanes can be decomposed to obtain silicon by a suitable processing (Nature 2006, 440, 783-786). The EP 1087428 A1 describes that solutions of polysilanes can be applied in a defined manner by ink jet methods in order to obtain silicon structures. The EP 1085579 A1 discloses that such solutions can be areally applied by suitable methods in order to generate thin films from silicon. The EP 1357154 A1 discloses that a special advantage of the use of high-molecular polysilanes compared with polysilanes with low boiling points resides in the possibility of a process management near normal pressure and the avoidance of CVD methods. Simultaneously, high-molecular polysilanes can be handled safer than low-molecular polysilanes since they have a slighter tendency for self-ignition on account of their lower vapor pressure and lower reactivity with air. A disadvantage of the method described in EP 1357154 A1 for the production of the polysilane mixtures used according to the prior art is the extensive multi-step process according to which at first low-molecular polysilanes are synthesized which thereafter are partly subjected to a photochemical chain prolongation in order to obtain a usable polysilane mixture with high-boiling portions. During the processing low-boiling polysilanes are lost by evaporation or have to be separated from the high-boiling portions by suitable separation methods prior to the processing of the polysilane mixture. The alternative production of polysilanes described in GB 2077710 A by the reaction of halogensilanes $SiH_mX_{4-m}$ with a stoichiometric excess of alkali metals generates polysilanes not soluble in THF with undefined chain length the solubility and thermal behavior of which are not described. For the production of polysilanes with an empiric composition near $(SiH_2)_n$ the use of $H_2SiCl_2$ is necessary which is not stable with respect to dismutation so that during a storing process self-igniting $SiH_4$ is generated, too. Furthermore, alkali metals are comparably expensive reduction agents.

The fast decomposition of polysilanes to silicon begins approximately at 300° C. In order to keep the losses of silicon into the gaseous phase by the evaporation of low-molecular polysilanes as low as possible the used polysilanes should not boil below the decomposition temperature at the used process pressure. The boiling point of a polysilane at a predetermined pressure increases with increasing molar weight. It is known that for chain-like polysilanes and normal pressure a boiling point of about 300° C. is obtained with the decasilane $Si_{10}H_{22}$ and a boiling point of about 350° C. is obtained with the tridecasilane $Si_{13}H_{28}$. The melting points of the corresponding polysilanes are above 0° C. Already the dodecasilane $Si_{12}H_{26}$ is solid at ambient temperature. Accordingly, mixtures of polysilanes the components of which are solid at ambient temperature are especially suited to enable the decomposition of silicon with small evaporation losses.

From DE 10 2005 024 041.A1 it is known that mixtures of largely chlorinated polysilanes can be obtained by the reaction of $SiCl_4$ with $H_2$ in a plasma method at low temperature.

OBJECT OF THE INVENTION

It is the object of the invention to provide polysilane mixtures with high boiling points and sufficient solubilities the synthesis of which is simplified and thus cheaper compared with the prior art.

SUMMARY OF THE INVENTION

This object is achieved by hydrogenating a mixture of largely halogenated, preferably fluorinated or chlorinated, more preferably, chlorinated, polysilanes generated according to DE 10 2005 024 041.A1 as intermediate product without further purification in suitable methods and by obtaining solid mixtures of polysilanes thereafter by a suitable post-treatment. The entire content of DE 10 2005 024 041.A1 is expressly incorporated herein by reference.

Alternatively, this object is achieved by the feature that, after a fractionation described in DE 10 2006 034 061.A1 with separation of the desired high-molecular portion of the halopolysilane, preferably, fluoropolysilane or chloropolysilane mixtures, more preferably chloropolysilane mixtures, this portion is hydrogenated in suitable methods and the resulting mixture of hydrogenated polysilanes is post-processed in a suitable manner to obtain a solid mixture of polysilanes. The entire content of DE 10 2006 034 061.A1 is also expressly incorporated herein by reference.

Preferably, methods and/or reaction conditions are used for the hydrogenation which do not result in a reduction of the number n of silicon atoms in the individual components of the used mixtures $Si_nX_n$ or $Si_nX_{n+2}$ (X is H or halo, preferably, F or Cl, more preferably Cl), i.e. do not cause a splitting of Si—Si linkages.

The hydrogenation of the non-processed largely halogenated, preferably, fluorinated or chlorinated polysilane mixtures or of largely halogenated, preferably, fluorinated or chlorinated polysilane fractions of suitable molecular masses can be carried out by means of stoichiometric chemical conversions with metal hydrides or metalloid hydrides known in the prior art, for instance $LiAlH_4$, $NaAlH_4$, $NaBH_4$, or with suitable catalytic methods with hydrogen or suitable hydrogen carrier compounds either.

After the hydrogenation of the non-processed largely halogenated, preferably, fluorinated or chlorinated polysilane mixtures the polysilanes which are volatile below their decomposition temperature below the desired process pressure can be separated, for instance, by distillation at normal pressure or by distillation at reduced pressure. These volatile polysilanes can be further used for the deposition of silicon layers in gas-phase processes, for instance CVD processes.

The separation of polysilanes with insufficient molecular mass can be realized by means of suitable solvents or solvent mixtures in which polysilanes of suitable molecular mass are less or more soluble compared with polysilanes of lower molecular mass. A separation of the obtained solutions from the solid residues can be carried out, for instance, through filtration or centrifugation.

The separation of the polysilanes with insufficient molecular mass can be realized by chromatographic methods, for instance GPC or HPLC.

As solvents for solid polysilane mixtures low-molecular polysilanes can serve which, after the application of the liquid onto a substrate with suitable methods, can be removed by evaporation.

As solvents or in solvent mixtures for the production of solutions or dispersions of solid polysilane mixtures organic liquids can be used either which do not react with components of the polysilane mixtures under handling conditions and which have a boiling point below the decomposition temperature of the polysilane mixtures.

Solid polysilane mixtures can be applied onto surfaces as solids and can be melted after their application through heat treatment to generate liquid polysilane structures or polysilane films which are decomposed thereafter through suitable methods to obtain silicon.

Solid polysilane mixtures can form dispersions with solvents or solvent mixtures in which the polysilanes are present in an only partly solved condition. Sufficiently small sizes of the dispersed polysilane particles allow furthermore the processing to homogenous polysilane structures or polysilane layers, especially if the process temperatures result in a melting of the remaining polysilane mixture after the evaporation of the solvent or the solvent mixture.

For the production of silicon structures or silicon layers with specific electronic characteristics the solutions or dispersions of the solid polysilane mixtures can be mixed with additional compounds in suitable amounts which, for instance, contain at least one element of the main groups III or V of the periodic system of elements.

For the production of silicon structures or silicon layers with specific electronic characteristics furthermore the solid polysilane mixtures can be mixed with additional compounds in suitable amounts, even after their production, which, for instance, contain at least one element of the main groups III or V of the periodic system of elements.

The compounds mixed with the solid polysilane mixtures or their solutions or dispersions preferably have boiling points at the applied process pressure which are at least as high as the decomposition temperatures of the polysilane mixtures. It is especially preferred that they decompose at similar temperatures as the polysilane mixtures so that the concentrations of the admixed elements in the produced silicon can be controlled and can be predetermined.

Solid polysilane mixtures oxidize slowly with air contact but are not self-igniting. The solid ignited in air with a flame extinguishes spontaneously when the source of ignition is removed and in the absence of an additional source of heat.

Therefore, prior to the further use of the solid polysilane mixtures it is advantageous to store the same in a transport container the surface of which is made light-proof and the interior of which with the solid polysilane mixture is applied with an inert gas. Furthermore, it is advantageous to provide this transport container with discharge means with which the solid polysilane mixture can be discharged in a controlled manner and can be provided for further use.

From the mixtures formed parts, as for instance pellets or rods, can be produced for a better handling and/or for reducing the oxidation sensibility of the solid polysilane mixtures. The production of formed parts can be connected with the addition of additives to promote the coherence of the formed parts and/or to reduce the oxidation sensibility of the obtained polysilanes.

The production of the formed parts can be realized up to temperatures at which the polysilane mixtures which are solid at ambient temperature melt completely or partly but are not yet decomposed.

Subsequently, the formed parts can be coated with a functional layer which, for instance, reduces the abrasion, improves the coherence of the formed parts and/or reduces the oxidation sensibility of the formed parts.

The substances used as additives or coating agents should not react with the components of the polysilane mixtures below the processing temperatures and should be either separable selectively prior to or during the production of the polysilane solutions or dispersions from the polysilanes or, if the remain contained in the solution or dispersion of the polysilane mixtures, evaporate at the applied process pressure from the surface on which silicon is to be generated before the decomposition temperature of the polysilane mixtures is reached in order to avoid contaminations of the generated silicon structures or layers.

Preferably according to the process for preparing the solid mixture of polysilanes, following hydrogenation, solid components of the composition $Si_nH_{2n}$ or $Si_nH_{2n+2}$ with n>10, preferably n>12, are separated at ambient temperature from the polysilane mixtures obtained by the hydrogenation.

Preferably according to the process for preparing the solid mixture of polysilanes, prior to the hydrogenation, the polysilane mixtures produced by plasmachemical methods are purified before the hydrogenation so that the hydrogenation of the used fractions results in polysilane solid at room temperature.

Preferably according to the process for preparing the solid mixture of polysilanes, the hydrogenation of the used polysilane mixtures is carried out by metal by metal hydrides or metalloid hydrides.

Preferably according to the process for preparing the solid mixture of polysilanes, following hydrogenation, compounds of further elements are mixed with the solid polysilane mixtures for the subsequent production of silicon with defined electrostatic characteristics. More preferably, the admixed compounds of further elements contain at least one element of Groups III or Group V of the periodic system.

In the following the invention is described by means of examples:

EXAMPLE 1

25.7 g of a largely chlorinated polysilane mixture obtained by plasmachemical methods are solved in 350 ml benzene and are dropped under stirring at 0° C. into 180 ml of a 1 m $LiAlH_4$ solution in diethylether. Thereafter, slow heating to ambient temperature is admitted. After 24 h the solid deposit is filtered off and is washed with benzene. The residue is extracted with 400 ml absolute ethanol at ambient temperature for the separation of lithium salts, and 3.85 g solid polysilane mixture is isolated as residue.

What is claimed is:

1. A process for producing solid mixtures of polysilanes comprising the steps of: producing largely halogenated, polysilane mixtures by plasmachemical methods, and hydrogenating said largely halogenated polysilane mixtures.

2. The process for producing solid mixtures of polysilanes according to claim 1 wherein the used mixtures of largely halogenated polysilanes are hydrogenated without selection of compounds with suitable molecular masses from the mixtures.

3. The process for producing solid mixtures of polysilanes according to claim 1 wherein solid components of the composition $Si_nH_{2n}$ or $Si_nH_{2n+2}$ with n>10, are separated at ambient temperature from the polysilane mixtures obtained by the hydrogenation.

4. The process for producing solid mixtures of polysilanes according to claim 1 wherein the largely halogenated polysilane mixtures produced by plasmachemical methods are fractionated before the hydrogenation so that the hydrogenation of the used fractions results in polysilanes solid at ambient temperature.

5. The process for producing solid mixtures of polysilanes according to claim 4 wherein the largely halogenated polysilane mixtures produced by plasmachemical methods are fractionated before the hydrogenation so that the hydrogenation of the used fractions results exclusively in polysilanes solid at ambient temperature.

6. The process for producing solid mixtures of polysilanes according to claim 1 wherein the hydrogenation of the used largely halogenated polysilane mixtures is carried out by metal hydrides or metalloid hydrides.

7. The process for producing solid mixtures of polysilanes according to claim 1 wherein the hydrogenation of the used largely halogenated polysilane mixtures is carried out by a catalytic method.

8. The process for producing solid mixtures of polysilanes according to claim 1 wherein compounds of further elements are mixed with the solid polysilane mixtures for the subsequent production of silicon with defined electronic characteristics.

9. The process for producing solid mixtures of polysilanes according to claim 8 wherein the admixed compounds contain at least one element of the main groups III or V of the periodic system.

10. The process for producing solid mixtures of polysilanes according to claim 8 wherein the solid polysilane mixtures in the form of solutions or dispersions are mixed with compounds of further elements for the subsequent production of silicon with defined electronic characteristics.

11. The process for producing solid mixtures of polysilanes according to claim 10 wherein the admixed compounds contain at least one element of the main groups III or V of the periodic system.

12. The process for producing solid mixtures of polysilanes according to claim 1 wherein formed parts are produced from the polysilane mixtures.

13. The process for producing solid mixtures of polysilanes according to claim 12 wherein the formed parts are produced through melting of portions of the polysilane mixtures.

14. The process for producing solid mixtures of polysilanes according to claim 12 wherein formed parts of polysilane mixtures are produced with the addition of additives.

15. The process for producing solid mixtures of polysilanes according to claim 14 wherein the additives improve the coherence of the formed parts.

16. The process for producing solid mixtures of polysilanes according to claim 14 wherein the additives reduce the oxidation sensitivity of the formed parts.

17. The process for producing solid mixtures of polysilanes according to claim 12 wherein the formed parts are coated with a material layer after their production.

18. The process for producing solid mixtures of polysilanes according to claim 17 wherein the material layer improves the coherence of the formed parts.

19. The process for producing solid mixtures of polysilanes according to claim 17 wherein the material layer improves the abrasion of the formed parts.

20. The process for producing solid mixtures of polysilanes according to claim 17 wherein the material layer reduces the oxidation sensitivity of the formed parts.

21. The process for producing solid mixtures of polysilanes according to claim 1 wherein these mixtures, prior to their use, can be stored and transported in light-proof transport containers applied with inert gas.

22. The process for producing solid mixtures of polysilanes according to claim 21 wherein the transport containers have discharge means by means of which the mixture can be supplied to further processing or to a hydrogen reactor.

23. A process for preparing a solid mixture of polysilanes, which comprises the steps of:
  (a) generating a mixture of halogenated polysilanes by reaction of $SiX_4$, wherein X is F, Cl, Br or I, with $H_2$ through a plasmachemical method; and
  (b) hydrogenating the mixture of halogenated polysilanes generated according to step (a) to obtain the solid mixture of polysilanes.

24. The process defined in claim 23, wherein following step (b), solid components of the composition $Si_nH_{2n}$ or $Si_nH_{2n+2}$ with n>10, are separated at ambient temperature from the polysilane mixtures obtained by the hydrogenation.

25. The process defined in claim 23, wherein prior to step (b) the polysilane mixtures produced by plasmachemical methods are fractionated before the hydrogenation so that the hydrogenation of the used fractions results in polysilane solid at room temperature.

26. The process defined in claim 23, wherein according to step (b), the hydrogenation of the used polysilane mixtures is carried out by metal hydrides or metalloid hydrides.

27. The process defined in claim 23 wherein following step (b), compounds of further elements are mixed with the solid polysilane mixtures for the subsequent production of silicon with defined electrostatic characteristics.

28. The process defined in claim 27 wherein the admixed compounds of further elements contain at least one element of Groups III or Group V of the periodic system.

29. A method for preparing a formed part comprising a solid mixture of polysilanes, which comprises the steps of:
   (a) generating a mixture of halogenated polysilanes by reaction of $SiX_4$, wherein X is F, Cl, Br or I, with $H_2$ through a plasmachemical method;
   (b) hydrogenating the mixture of halogenated polysilanes generated according to step (a) to obtain the solid mixture of polysilanes; and
   (c) preparing a formed part of the solid mixture of polysilanes obtained according to step (b).

30. The method for preparing a formed part comprising a solid mixture of polysilanes defined in claim 29, further comprising the step of coating the formed part with a material layer.

31. A method for producing a solution or a dispersion of a solid mixture of polysilanes on a substrate, which comprises the steps of:
   (a) generating a mixture of halogenated polysilanes by reaction of $SiX_4$, wherein X is F, Cl, Br or I, with $H_2$ through a plasmachemical method;
   (b) hydrogenating the mixture of halogenated polysilanes generated according to step (a) to obtain the solid mixture of polysilanes; and
   (c) dissolving or dispersing the solid mixture of polysilanes in a solvent.

32. A method of depositing a polysilane layer on a substrate which comprises the steps of:
   (a) generating a mixture of halogenated polysilanes by reaction of $SiX_4$, wherein X is F, Cl, Br or I, with $H_2$ through a plasmachemical method;
   (b) hydrogenating the mixture of halogenated polysilanes generated according to step (a) to obtain the solid mixture of polysilanes;
   (c) dissolving or dispersing the solid mixture of polysilanes in a solvent; and
   (d) applying the solution or dispersion of the solid mixture of polysilanes in a solvent to a substrate to form a layer on the substrate.

* * * * *

UNITED STATES PATENT AND TRADEMARK OFFICE
CERTIFICATE OF CORRECTION

PATENT NO. : 8,177,943 B2
APPLICATION NO. : 12/402852
DATED : May 15, 2012
INVENTOR(S) : Norbert Auner et al.

It is certified that error appears in the above-identified patent and that said Letters Patent is hereby corrected as shown below:

Title Page, Item (75) Inventors, should read

Norbert Auner, Glashuetten (DE), Sven Holl, Gueckingen (DE), Christian Bauch, Usingen (DE), Gerd Lippold, Markkleeberg (DE), Rumen Deltschew, Leipzig (DE), <u>Javad Mohsseni, Bitterfeld-Wolfen (DE)</u>

Signed and Sealed this
Fifth Day of November, 2013

Teresa Stanek Rea
*Deputy Director of the United States Patent and Trademark Office*